US006276526B1

(12) United States Patent
Miller et al.

(10) Patent No.: US 6,276,526 B1
(45) Date of Patent: Aug. 21, 2001

(54) FLANGED EDGE PROTECTOR FOR WINDOW UNIT

(75) Inventors: Scot C. Miller; Jeffrey S. Wetter; Fred L. Hrdlicka, all of Pella, IA (US)

(73) Assignee: Pella Corporation, Pella, IA (US)

( * ) Notice: Subject to any disclaimer, the term of this patent is extended or adjusted under 35 U.S.C. 154(b) by 0 days.

(21) Appl. No.: 09/394,423

(22) Filed: Sep. 13, 1999

(51) Int. Cl.[7] ................................ B32B 3/02; B32B 3/08

(52) U.S. Cl. .......................... 206/321; 206/453; 206/586; 428/43; 428/119; 428/124

(58) Field of Search ............................. 428/43, 119, 120, 428/124; 206/321, 325, 453, 454, 586

(56) References Cited

U.S. PATENT DOCUMENTS

| | | | |
|---|---|---|---|
| 1,675,147 | 6/1928 | Walter . | |
| 2,742,146 | 4/1956 | Lester, Jr. . | |
| 2,757,854 | 8/1956 | Wall . | |
| 2,878,982 * | 3/1959 | Gariepy ................................ | 206/586 |
| 2,929,495 | 3/1960 | Simonsen . | |
| 3,095,970 | 7/1963 | Gaulke . | |
| 4,162,729 | 7/1979 | Kaiser et al. . | |
| 4,399,915 | 8/1983 | Sorenson . | |
| 4,583,639 | 4/1986 | Fedick et al. . | |
| 4,700,844 | 10/1987 | Griffith . | |
| 4,884,687 | 12/1989 | Steves . | |
| 5,255,727 | 10/1993 | Saruwatari et al. . | |

* cited by examiner

*Primary Examiner*—Alexander S. Thomas
(74) *Attorney, Agent, or Firm*—Hovey, Williams, Timmons & Collins

(57) ABSTRACT

An edge protector for a fenestration product is integrally formed of a single sheet of corrugated paperboard that has been perforated, slit, scored, glued, and folded in a particular manner so as to be generally flat in overall configuration prior to being placed in use. At the time of installation, the protector is partially unfolded out of its flat plane to assume an overall generally transversely L-shaped configuration, having a pair of legs intersecting one another at right angles to form a receiving corner for the face and side margins of the product. One leg of the protector forms a flap that covers a marginal portion of the face of the product when the protector is fitted onto the product, while the other leg forms a second flap that covers a marginal portion of the sides of the product. A stiff, relatively short spacer flange comprising a double layer of the material glued together projects edgewise from the outside of the corner in the opposite lateral direction from the side flap to keep the face of the product spaced away from foreign objects. Wrapping of the protector around an outside corner of the product is facilitated by the provision of tear-out tabs embodied in the face flap so that the appropriate tab aligned with the corner of the product may be torn out to leave an empty notch in the flap at that location. The absence of material at the corner of the product eliminates the structural rigidity otherwise afforded by the face flap at that location to enable the protector to more readily bend around the corner.

63 Claims, 2 Drawing Sheets

FLANGED EDGE PROTECTOR FOR WINDOW UNIT

TECHNICAL FIELD

The present invention relates to the field of fenestration products such as windows and doors. In particular, the invention is concerned with an edge protector made from corrugated paperboard configured to present a circumscribing flange extending outwardly from the product edge to protect the product edge and adjacent cladding during shipment.

BACKGROUND

A fenestration product such as a door or window includes a pane surrounded by frame members. The exterior or front face of the product includes metal cladding covering those portions of the frame members adjacent the outboard edge of the product and covering a portion of the side walls of the frame members. The cladding is typically composed of aluminum, protects the frame members from exposure to the elements and enhances the aesthetic appearance of the product.

During shipment of the fenestration product, the cladding may be subject to dents and scratches. In order to prevent such damage, the prior art teaches to cover the cladding with two or three layers of corrugated paperboard strapped against the front face and side walls of the cladding. But even with these layers of protection, damage may still occur during shipment.

SUMMARY OF THE INVENTION

The present invention solves the prior art problem discussed above and provides a distinct advance in the state of the art. In particular, the edge protector hereof provides a simple, relatively low-cost, yet effective means of protecting fenestration products during shipment.

The preferred edge protector in accordance with the present invention is integrally formed of a single strip of corrugated paperboard that has been perforated, slit, folded, glued and scored in a particular manner. In its finished form, the protector is generally transversely L-shaped overall, having a pair of intersecting right-angle legs that define a front or face flap for covering a marginal portion of the metal cladding on the front face of the product and a side flap for covering a marginal portion of the metal cladding on the side of the product. In addition, the protector has a relatively narrow, stiff spacer flange generally in the same plane as the side flap but extending in the opposite lateral direction for spacing foreign objects away from the edge of the product. The spacer flange is transversely relatively short and stubby, so as to possess greater column strength than would otherwise be the case when spacing the front face of the product away from foreign objects. To further aid in producing inherent rigidity, the spacer flange is comprised of a double layer of the paperboard, while each of the face and side flaps is comprised of only a single layer of material. The two layers of the flange are bonded together with a suitable adhesive.

At a corner of the product, the protector is bent up 90° out of its flat plane along a transverse bend line so as to wrap around the corner without necessitating the use of a new piece of the protector. To facilitate bending of the protector around the corner, the face flap of the protector is comprised of a longitudinal series of alternating tear-out and non-tear-out tabs. By manually removing the appropriate tear-out tab aligned with the corner of the product, the face flap is presented with an open notch at that location which offers no resistance to bending. A metal strapping band or the like may be tightly wrapped around the entire protector when it is in place on the product so as to detachably secure the protector to the product.

In fabricating the protector, the single flat strip of corrugated paperboard is initially passed longitudinally through perforating and scoring dies that perform a number of different operations on the strip. One operation is the formation of a longitudinally extending, primary line of weakness located generally centrally of the strip but closer to one lateral extremity than the other. This line of weakness becomes the hinge line about which one longitudinally extending side margin of the strip is later folded over on top of the main body of the strip to produce the two layers of the protector in those areas where two layers are desired.

A secondary line of weakness is produced in the strip parallel to but spaced a short distance from the primary line of weakness toward the one lateral extremity of the strip. A ribbon of adhesive is applied to the region between the two lines of weakness so that, when the side margin of the strip is folded over onto the main body of the strip along the primary line of weakness, the superimposed layers bond together to the extent of the width of the adhesive ribbon to form the stubby spacer flange. The remaining, unadhered part of the folded-over portion serves as the face flap when it is later bent up out of the plane of the flange along the secondary line of weakness just before the protector is installed on the product.

Prior to the top layer being folded over, the strip is provided with a longitudinally extending series of transverse tear lines extending from the secondary line of weakness out to the one lateral extremity of the strip. Such tear lines define the fore-and-aft extremities of the corner tear-out tabs in the face flap of the protector. After the strip is folded along the primary line of weakness, the folded strip may be passed between a pair of crush rollers to form a light crush score along the full length of the strip that passes across all of the tear-out tabs. The crush score facilitates removal of the appropriate tear-out tab during installation of the protector without adversely affecting the covering and protecting qualities of the face and side flaps.

DETAILED DESCRIPTION OF THE PREFERRED EMBODIMENT

Figure 1:
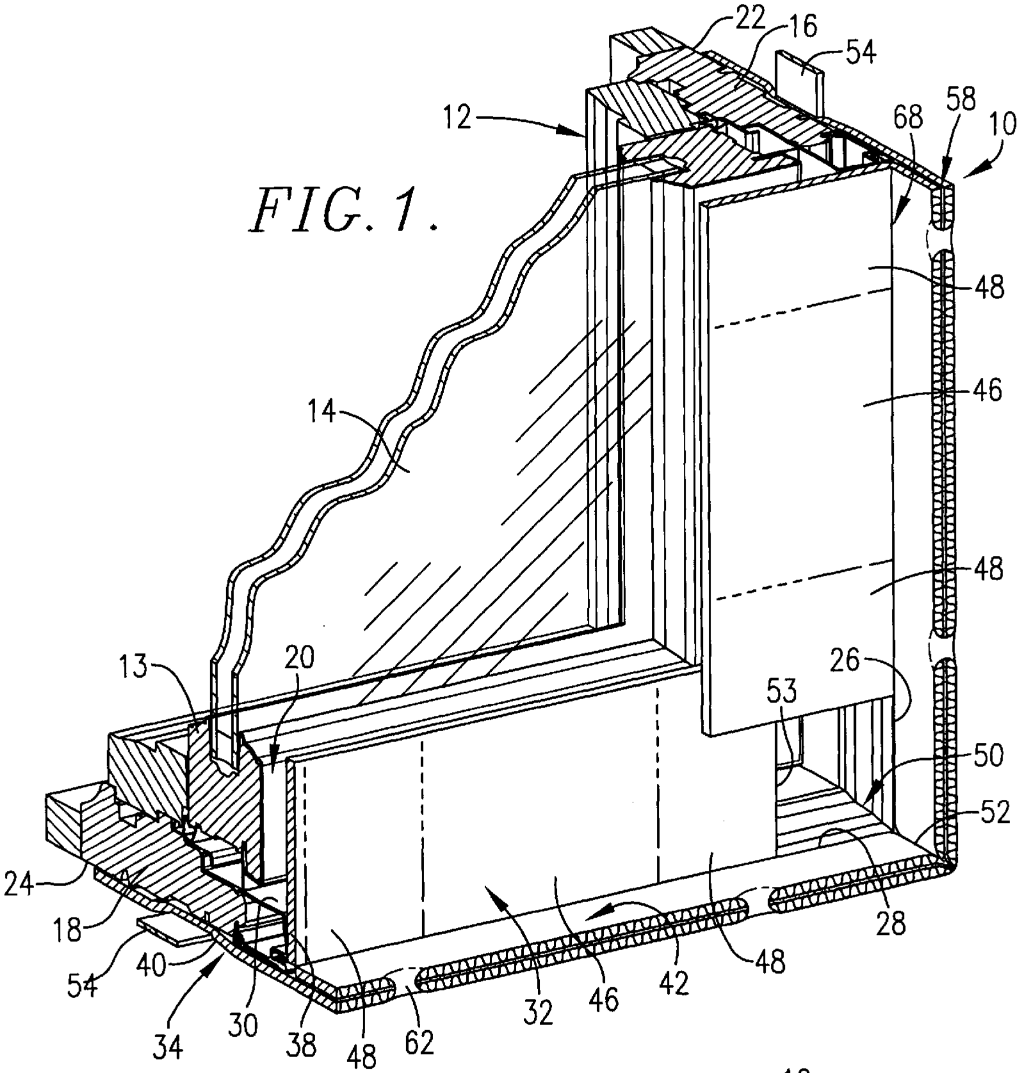
FIG. 1 is a fragmentary pictorial view of a protector embodying the principles of the present invention installed on a fenestration product.
Figure 2:
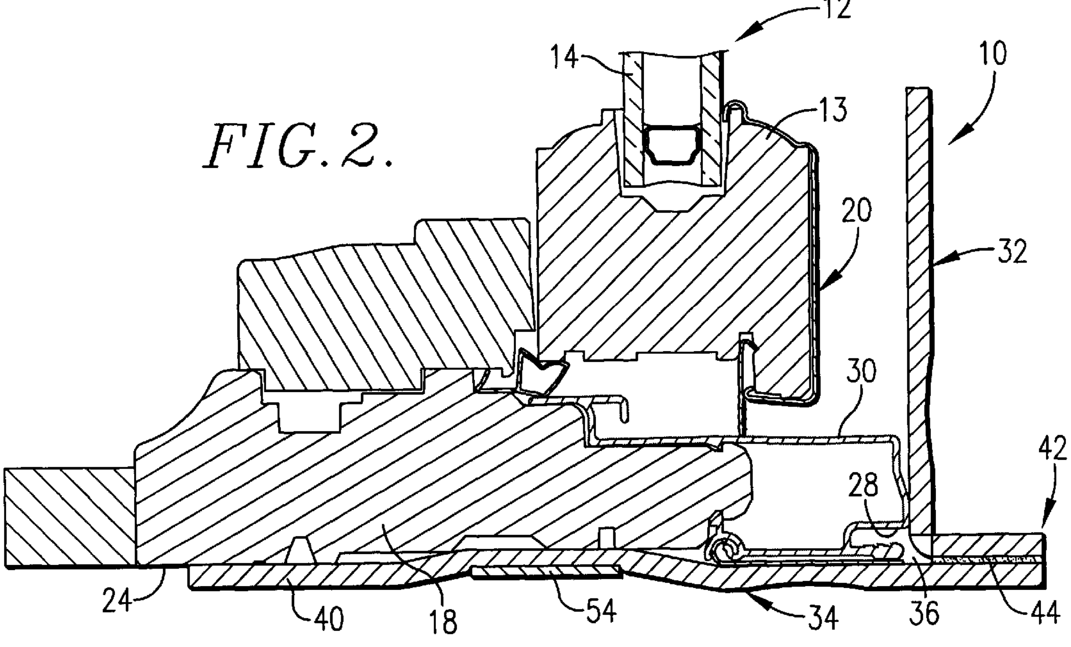
FIG. 2 is a fragmentary, transverse cross-sectional view thereof.

FIGS. 1 and 2 illustrate an edge protector 10 according to the present invention installed on a fenestration product such as window 12 for shipment. Window 12 includes a sash 13 having a pane 14. The sash 13 is surrounded by vertical frame members 16 and horizontal frame members 18.

A front face of the window 12 is denoted generally by the numeral 20. Frame members 16, 18 present respective sides 22 and 24 that are generally transverse to front face 20. Vertical front edges 26 and horizontal front edges 28 are generally defined at the intersections of sides 22, 24 and front face 20.

Frame members 16 and 18 are preferably composed of wood with aluminum cladding 30 extending over portions of the sides 22, 24 and front face 20. Edge protector 10 is used to protect window edges 26, 28, cladding 30, and marginal portions of the front face 20 during shipment of window 12.

The protector 10 is generally L-shaped in overall transverse cross-sectional configuration (reversely L-shaped as viewed from the vantage points of FIGS. 1 and 2), presenting a pair of legs 32 and 34 that intersect one another at right angles to form a receiving corner 36. The leg 32 presents a flat, wide face flap 38 for covering a marginal portion of the window face 20 when the edges 26 and 28 of the window are received in the corner 36, while the leg 34 presents a flat, even wider side flap 40 for covering a marginal portion of the window sides 22 and 24.

In addition, the protector includes a relatively narrow, stiff spacer flange 42 at the exterior of the corner 36 disposed generally in the same plane as the side flap 40 but projecting edgewise laterally outwardly from the face flap 38 in the opposite direction. The spacer flange is transversely much shorter than the flaps 38 and 40 so as to be relatively stubby, thus possessing greater inherent, columnar rigidity than the flaps 38, 40. Rigidity is further enhanced by the fact that the flange 42 is constructed from a lamination of two superimposed layers of material bonded together by a ribbon of adhesive 44.

The face flap 38 is comprised of a longitudinally extending series of alternating, rectangular, tear-out and non-tear-out tabs 46 and 48. As illustrated in FIG. 1, in order to facilitate wrapping of the protector 10 around the corner 50 of the window 12 about a transverse bend line 52 during installation, an appropriate tear-out tab 46 aligned with the window corner 50 may be removed from the face flap 38. The absent tab presents an open notch 53 that eliminates the inherent structural resistance to bending of the protector about line 52 otherwise provided by the flap 38. A metal strapping band 54 or the like may be tightly wrapped around the perimeter of the protector/window assembly to removably secure the protector 10 in place on the window 12.

Figures 3, 4, 5, 6, 7:
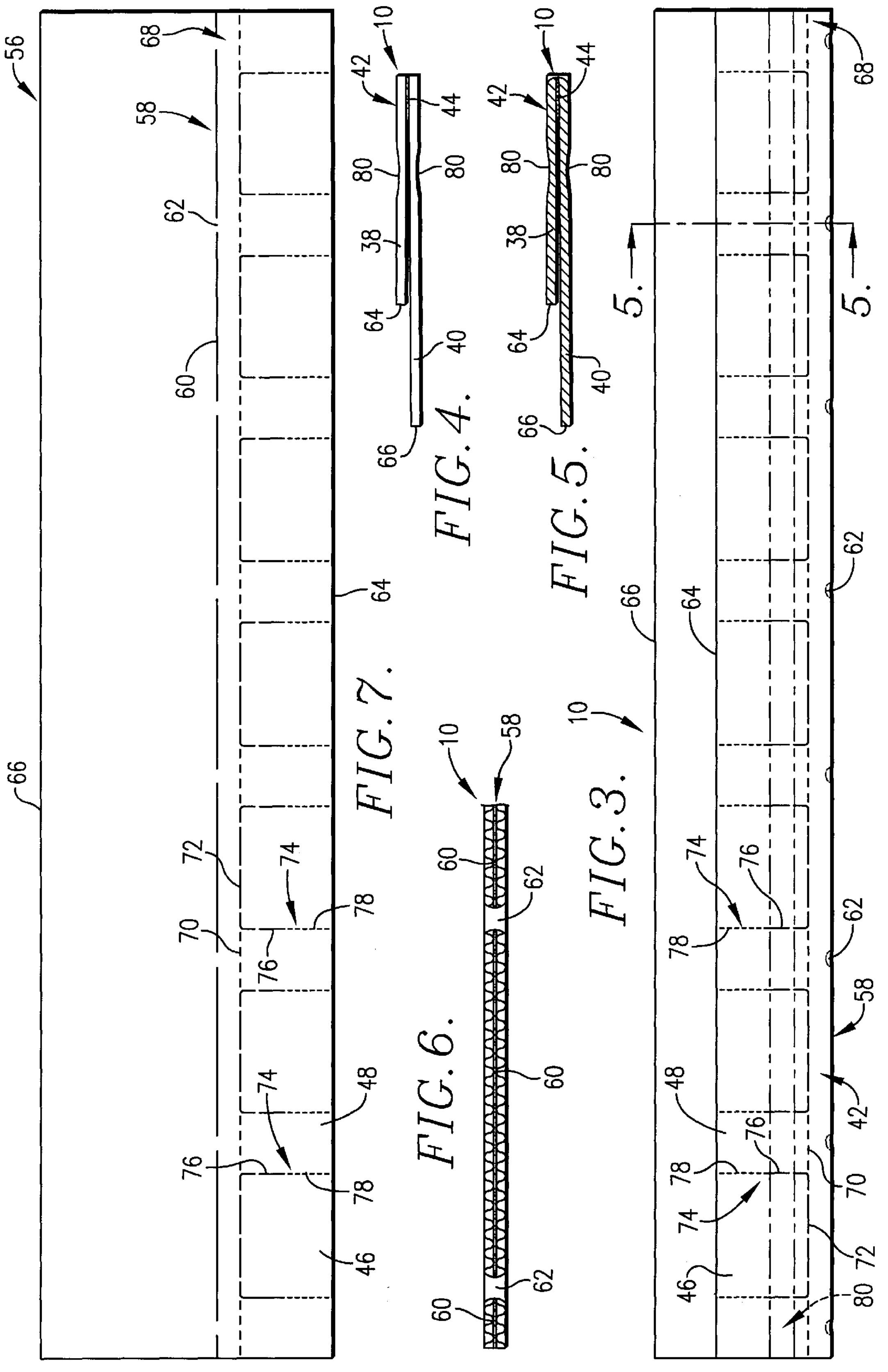
FIG. 3 is a top plan view of protector of FIG. 1 in its substantially flat mode prior to installation.
FIG. 4 is a left end elevational view thereof.
FIG. 5 is a transverse cross-sectional view of the protector taken substantially along line 5—5 of FIG. 3.
FIG. 6 is a fragmentary, outer edge view of the double-layer edge of the protector at the primary line of weakness.
FIG. 7 is a flat pattern of the protector in strip form prior to gluing and folding but after producing various perforations, cuts, and lines of weakness in the strip.

In its preferred form, the protector 10 is integrally formed from a single rectangular strip 56 of corrugated paperboard as shown in FIG. 7. To convert the strip 56 into a protector, the strip is passed through a series of perforating, slitting, and scoring dies (not shown) that perform various operations on the strip, in addition to a glue applicator and folding structure (both not shown). After these operations are completed, and before installation, the protector 10 assumes the generally flat overall configuration shown in FIGS. 3–6.

As the strip 56 is passed lengthwise through the dies, a longitudinally extending primary line of weakness 58 is produced to form a fold line. In the preferred form of the invention, the primary line of weakness 58 is defined by a series of aligned slits 60 in the material, alternating with a series of uncut nibs 62. The primary line of weakness 58 is located generally centrally of the strip, though somewhat closer to lateral extremity 64 than to lateral extremity 66.

A secondary line of weakness 68 is also produced in the flat strip 56 parallel to the primary line of weakness 58 and spaced a short distance therefrom. The secondary line of weakness 68 is closer to the lateral extremity 64 than is the primary line of weakness 58. In the preferred from of the invention, the secondary line of weakness 68 is defined by a series of alternating sets of perforations 70 and slits 72. Each set of slits 72 is approximately twice as long as each set of perforations 70. The secondary line of weakness 68 produces a second fold line in the strip of material 56.

The alternating tear-out tabs 46 and non-tear-out tabs 48 are produced by a longitudinally extending series of transverse, mutually parallel tear lines 74 extending from the secondary line of weakness 68 to the lateral extremity 64. In the preferred form of the invention, each tear line 74 comprises a series of aligned slits 76 nearest the secondary line of weakness 68 and a series of perforations 78 remote from the line of weakness, extending from the slits 76 to the lateral extremity 64. Each tear line 74 intersects the secondary line of weakness 68 at a point of change between perforations 70 and slits 72.

Ultimately, the marginal portion of the strip 56 between the primary line of weakness 58 and the lateral extremity 64 is folded over on top of the remaining body of the strip between the primary line of weakness 58 and the other lateral extremity 66. However, before that folding step occurs, the ribbon of glue 44 is applied to the region between the lines of weakness 58 and 68. When the folding step then takes place, the top layer becomes adhered to the bottom layer to the extent of the width of the glue ribbon 44, forming the stiff spacer flange 42. The remainder of the top layer remains unadhered to the bottom layer as illustrated best in FIGS. 4 and 5, forming the flap 38 before it has been bent up out of the plane of the flange 42. In the folded, generally flat condition, the protector 10 is then passed between a pair of crush rollers (not shown) to produce a light crush score 80 that runs the full length of the protector across the tear-out tabs 46 and the non-tear-out tabs 48. This facilitates tearing out of the appropriate tab 46 during installation by simply inserting fingers under the free edge of the selected tab 46 and pulling up along the tear lines 76 before then tearing sideways along the secondary line of weakness 68. Prior to installation, the flap 38 is bent up about the secondary line of weakness 68 to render the protector generally L-shaped in overall cross-sectional configuration.

In the preferred embodiment, the ribbon of adhesive 44 is sufficient to create flange 42 having a width of about 0.75 inches. The tear-out tabs 46 are spaced apart on six inch centers. The tear lines 74 are spaced apart by a distance of approximately 4.00 inches. Each line of perforations 78 is approximately 1.75 inches long, and each line of slits 76 is approximately 1.25 inches long.

Those skilled in the art will appreciate that the present invention encompasses many variations in the preferred embodiment described herein. For example, the edge protector hereof finds utility in protecting products other than fenestration products. Also, edge protector can be constructed from a wide variety of materials other than the preferred corrugated paperboard.

Having thus described the preferred embodiment of the present invention, the following is claimed as new and desired to be secured by Letters Patent:

1. An edge protector for use with a product having a product face, a plurality of sides extending generally transverse to said face in surrounding relationship therewith, and an edge between each of said sides and the face, said protector comprising:

a generally planar face flap for covering a marginal portion of said face of the product when the protector is installed on the product;

a generally planar side flap projecting transversely outwardly in one direction from the face flap for covering a marginal portion of a side of the product when the protector is installed on the product; and a generally planar spacer flange projecting transversely outwardly in the opposite direction from said face flap for spacing foreign objects away from the face and edge of the product when the protector is installed on the product, said protector being formed by a pair of superimposed layers of planar material, one layer of said material presenting said face flap and a first layer of said flange, the other layer of said material presenting said side flap and a second layer of said flange, said one layer having a line of weakness between said face flap and said first layer of the flange, permitting the face flap to be initially formed within the plane of said first layer of the flange and to then be hinged out of said plane along the line of weakness until disposed transverse to said side flap, said first and second layers of said flange being permanently secured together.

2. An edge protector as claimed in claim 1, said first and second layers of said flange having an adhesive therebetween that permanently secures said first and second layers together.

3. An edge protector as claimed in claim 2, said planar material comprising corrugated paperboard.

4. An edge protector as claimed in claim 1, said spacer flange being located generally in the same plane as said side flap.

5. An edge protector as claimed in claim 1, said face flap being narrower than said side flap.

6. An edge protector for use with a product having a product face, a plurality of sides extending generally transverse to said face in surrounding relationship therewith, and an edge between each of said sides and the face, said protector comprising:

a generally planar face flap for covering a marginal portion of said face of the product when the protector is installed on the product;

a generally planar side flap projecting transversely outwardly in one direction from the face flap for covering a marginal portion of a side of the product when the protector is installed on the product; and a generally planar spacer flange projecting transversal outwardly in the opposite direction from said face flap for spacing foreign objects away from the face and edge of the product when the protector is installed on the product, said protector being formed by a pair of superimposed layers of planar material, one layer of said material presenting said face flap and a first layer of said flange, the other layer of said material presenting said side flap and a second layer of said flange, said one layer having a line of weakness between said face flap and said first layer of the flange, permitting the face flap to be initially formed within the plane of said first layer of the flange and to then be hinged out of said plane along the line of weakness until disposed transverse to said side flap, said superimposed layers of material being formed from a single sheet of said material folded over along a fold line, said line of weakness including a series of perforations, said perforations being arranged in linearly spaced sets, said line of weakness further including a plurality of longitudinal tear lines arranged in alternating sequence with the sets of perforations, said face flap having a plurality of transverse tear lines spaced along the length thereof and intersecting said line of weakness at spaced locations along the latter whereby to present a longitudinal series of tabs that may be torn out selectively from the face flap to facilitate bending of the protector around a corner of the product.

7. An edge protector as claimed in claim 6, said transverse tear lines intersecting said line of weakness at each change between perforations and longitudinal tear lines in the line of weakness.

8. An edge protector as claimed in claim 7, each set of perforations in the line of weakness cooperating with a corresponding pair of transverse tear lines to define a non-tear out tab, and each longitudinal tear line in the line of weakness cooperating with a corresponding pair of transverse tear lines to define one of said tear out tabs, said tear out tabs and said non-tear out tabs being disposed in alternating succession along the length of the face flap.

9. An edge protector as claimed in claim 7, each of said transverse tear lines including a transverse series near the line of weakness of alternating slits and uncut nibs in the material, and a transverse series remote from the line of weakness of perforations.

10. An edge protector as claimed in claim 9, each of said longitudinal tear lines in said line of weakness including alternating slits and uncut nibs in the material.

11. An edge protector as claimed in claim 6, each of said longitudinal tear lines in said line of weakness including alternating slits and uncut nibs in the material.

12. An edge protector as claimed in claim 6, said face flap having a longitudinal crush line therein that extends parallel to the line of weakness in laterally spaced relationship therewith to facilitate tear out of the tabs of the face flap.

13. A protectively wrapped product assembly comprising:

a product having a product face, a plurality of sides extending generally transverse to said face in surrounding relationship therewith, and an edge between each of said sides and the face; and a generally transversely L-shaped edge protector releasably secured to the product and extending along the entire length of said edges of the product face, said protector including, a planar face flap covering a marginal portion of said face of the product, a planar side flap projecting transversely outwardly in one direction from the face flap and covering a marginal portion of a side of the product, and a planar spacer flange projecting transversely outwardly in the opposite direction from the face flap for spacing foreign objects away from the edges and face of the product.

14. A protectively wrapped product assembly as claimed in claim 13, said protector being formed by a pair of superimposed layers of planar material, one layer of said material presenting said face flap and a first layer of said flange, the other layer of said material presenting said side flap and a second layer of said flange, said one layer having a line of weakness between said face flap and said first layer of the flange, permitting the face flap to be initially formed within the plane of said first layer of the flange and to then be hinged out of said plane along the line of weakness until disposed transverse to said side flap.

15. A wrapped product assembly as claimed in claim 14, said planar material comprising corrugated paperboard.

16. A wrapped product assembly as claimed in claim 14, said superimposed layers of material being formed from a single sheet of said material folded over along a fold line.

17. A wrapped product assembly as claimed in claim 16, said single sheet of material being constructed of corrugated paperboard.

18. A wrapped product assembly as claimed in claim 17, said fold line being formed by a series of slits through the material, interrupted by nibs of uncut material between adjacent cuts in the series.

19. A wrapped product assembly as claimed in claim 16, said line of weakness including a series of perforations.

20. A wrapped product assembly as claimed in claim 13, said spacer flange being located generally in the same plane as said side flap.

21. A wrapped product assembly as claimed in claim 13, said face flap being narrower than said side flap.

22. A wrapped product assembly as claimed in claim 13, said product comprising a window.

23. A protectively wrapped product assembly comprising:

a product having a product face, a plurality of sides extending generally transverse to said face in surrounding relationship therewith, and an edge between each of said sides and the face; and a generally transversely L-shaped edge protector releasably secured to the product along at least one edge thereof, said protector including, a planar face flap covering a marginal portion of said face of the product, a planar side flap projecting transversely outwardly in one direction from the face flap and covering a marginal portion of a side of the product, and a planar spacer flange projecting transversely outwardly in the opposite direction from the face flap for spacing foreign objects away from the edge and face of the product, said protector being formed by a pair of superimposed layers of planar material, one layer of said material presenting said face flap and a first layer of said flange, the other layer of said material presenting said side flap and a second layer of said flange, said one layer having a line of weakness between said face flap and said first layer of the flange, permitting the face flap to be initially formed within the plane of said first layer of the flange and to then be hinged out of said plane along the line of weakness until disposed transverse to said side flap, said first and second layers of said flange being permanently secured together.

24. A wrapped product assembly as claimed in claim 23, said first and second layers of said flange having an adhesive therebetween that permanently secures said first and second layers together.

25. A wrapped product assembly as claimed in claim 24, said planar material comprising corrugated paperboard.

26. A protectively wrapped product assembly comprising:

a product having a product face, a plurality of sides extending generally transverse to said face in surrounding relationship therewith, and an edge between each of said sides and the face; and a generally transversely L-shaped edge protector releasably secured to the product along at least one edge thereof, said protector including, a planar face flap covering a marginal portion of said face of the product, a planar side flap projecting transversely outwardly in one direction from the face flap and covering a marginal portion of a side of the product, and a planar spacer flange projecting transversely outwardly in the opposite direction from the face flap for spacing foreign objects away from the edge and face of the product, said protector being formed by a pair of superimposed layers of planar material, one layer of said material presenting said face flap and a first layer of said flange, the other layer of said material presenting said side flap and a second layer of said flange, said one layer having a line of weakness between said face flap and said first layer of the flange, permitting the face flap to be initially formed within the plane of said first layer of the flange and to then be hinged out of said plane along the line of weakness until disposed transverse to said side flap, said superimposed layers of material being formed from a single sheet of said material folded over along a fold line, said line of weakness including a series of perforations, said perforations being arranged in linearly spaced sets, said line of weakness further including a plurality of longitudinal tear lines arranged in alternating sequence with the sets of perforations, said face flap having a plurality of transverse tear lines spaced along the length thereof and intersecting said line of weakness at spaced locations along the latter whereby to present a longitudinal series of tabs that may be torn out selectively from the face flap to facilitate bending of the protector around a corner of the product.

27. A wrapped product assembly as claimed in claim 26, said transverse tear lines intersecting said line of weakness at each change between perforations and longitudinal tear lines in the line of weakness.

28. A wrapped product assembly as claimed in claim 27, each set of perforations in the line of weakness cooperating with a corresponding pair of transverse tear lines to define a non-tear out tab, and each longitudinal tear line in the line of weakness cooperating with a corresponding pair of transverse tear lines to define one of said tear out tabs, said tear out tabs and said non-tear out tabs being disposed in alternating succession along the length of the face flap.

29. A wrapped product assembly as claimed in claim 27, each of said transverse tear lines including a transverse series near the line of weakness of alternating slits and uncut nibs in the material, and a transverse series remote from the line of weakness of perforations.

30. A wrapped product assembly as claimed in claim 29, each of said longitudinal tear lines in said line of weakness including alternating slits and uncut nibs in the material.

31. A wrapped product assembly as claimed in claim 26, each of said longitudinal tear lines in said line of weakness including alternating through cuts and uncut nibs in the material.

32. A wrapped product assembly as claimed in claim 26, said face flap having a longitudinal crush line therein that extends parallel to the line of weakness in laterally spaced relationship therewith to facilitate tear out of the tabs of the face flap.

33. An edge protector for use with a window having a face, a plurality of sides extending generally transverse to said face in surrounding relationship therewith, and an edge between each of said sides and the face, said protector comprising:

an elongated, generally flat strip including two superimposed layers of corrugated paperboard material, said material being of such weight and strength as to permit the strip to be bent transversely out of a single plane during wrapping thereof around a corner of the window when the protector is installed on the window along the edge thereof, said layers being adhered together along a marginal edge of the strip to form a double-layer spacer flange within the plane of the strip, said layers being unadhered to one another in areas of the strip inboard of the flange, one of said layers having a longitudinally extending line of weakness running alongside of said flange to allow the unadhered portion of said one layer to be hinged out of the plane of the strip about the line of weakness when the protector is to be installed on a window for forming a face flap that projects transversely from the plane of the strip for covering a marginal portion of the face of the window, the unadhered portion of the other layer forming a side flap disposed within the plane of the strip for covering a marginal portion of one or more sides of the window when the protector is installed on a window.

34. An edge protector as claimed in claim 33, said superimposed layers of material being formed from a single sheet of said material folded over along a fold line.

35. An edge protector as claimed in claim 34, said fold line being formed by a series of slits through the material, interrupted by nibs of uncut material between adjacent slits in the series.

36. An edge protector as claimed in claim 33, said line of weakness including a series of perforations.

37. An edge protector as claimed in claim 36, said perforations being arranged in linearly spaced sets, said line of weakness further including a plurality of longitudinal tear lines arranged in alternating sequence with the sets of perforations, said face flap having a plurality of transverse tear lines spaced along the length thereof and intersecting said line of weakness at spaced locations along the latter whereby to present a longitudinal series of tabs that may be torn out selectively from the face flap to facilitate bending of the protector around a corner of the window.

38. An edge protector as claimed in claim 37, said transverse tear lines intersecting said line of weakness at each change between perforations and longitudinal tear lines in the line of weakness.

39. An edge protector as claimed in claim 38, each set of perforations in the line of weakness cooperating with a corresponding pair of transverse tear lines to define a non-tear out tab, and each longitudinal tear line in the line of weakness cooperating with a corresponding pair of transverse tear lines to define one of said tear out tabs, said tear out tabs and said non-tear out tabs being disposed in alternating succession along the length of the face flap.

40. An edge protector as claimed in claim 38, each of said transverse tear lines including a transverse series of alternating slits and uncut nibs in the material near the line of weakness, and a transverse series of perforations remote from the line of weakness.

41. An edge protector as claimed in claim 40, each of said longitudinal tear lines in said line of weakness including alternating slits and uncut nibs in the material.

42. An edge protector as claimed in claim 41, said fold line being formed by a series of slits through the material, interrupted by nibs of uncut material between adjacent slits in the series.

43. An edge protector as claimed in claim 37, each of said longitudinal tear lines in said line of weakness including alternating slits and uncut nibs in the material.

44. An edge protector as claimed in claim 37, said face flap having a longitudinal crush line therein that extends parallel to the line of weakness in laterally spaced relationship therewith to facilitate tear out of the tabs of the face flap.

45. An edge protector as claimed in claim 33, said face flap being narrower than said side flap.

46. An edge protector for use with a product having a product face, a plurality of sides extending generally transverse to said face in surrounding relationship therewith, and an edge between each of said sides and the face, said protector comprising:

a generally planar face flap for covering a marginal portion of said face of the product when the protector is installed on the product;

a generally planar side flap projecting transversely outwardly in one direction from the face flap for covering a marginal portion of a side of the product when the protector is installed on the product; and a generally planar spacer flange projecting transversely outwardly in the opposite direction from said face flap for spacing foreign objects away from the face and edge of the product when the protector is installed on the product, said protector being formed by a pair of superimposed layers of planar material, one layer of said material presenting said face flap and a first layer of said flange, the other layer of said material presenting said side flap and a second layer of said flange, said one layer having a line of weakness between said face flap and said first layer of the flange, permitting the face flap to be initially formed within the plane of said first layer of the flange and to then be hinged out of said plane along the line of weakness until disposed transverse to said side flap, said face flap having a plurality of transverse tear lines spaced along the length thereof and intersecting said line of weakness at spaced locations along the latter whereby to present a longitudinal series of tabs that may be torn out selectively from the face flap to facilitate bending of the protector around a corner of the product.

47. An edge protector as claimed in claim 46, said superimposed layers of material being formed from a single sheet of said material folded over along a fold line.

48. An edge protector as claimed in claim 47, said first and second layers of said flange being permanently secured together.

49. An edge protector as claimed in claim 48, said face flap having a longitudinal crush line therein that extends parallel to the line of weakness in laterally spaced relationship therewith to facilitate tear out of the tabs of the face flap.

50. An edge protector as claimed in claim 46, said first and second layers of said flange being permanently secured together.

51. An edge protector as claimed in claim 50, said face flap having a longitudinal crush line therein that extends parallel to the line of weakness in laterally spaced relationship therewith to facilitate tear out of the tabs of the face flap.

52. An edge protector as claimed in claim 46, said face flap having a longitudinal crush line therein that extends parallel to the line of weakness in laterally spaced relationship therewith to facilitate tear out of the tabs of the face flap.

53. An edge protector as claimed in claim 46, said line of weakness including slits in the one layer of material between each pair of transverse tear lines to facilitate tear-out of the tabs.

54. A protectively wrapped window assembly comprising:

a window having a face, a plurality of sides extending generally transverse to said face in surrounding relationship therewith, and an edge between each of said sides and the face; and a generally transversely L-shaped edge protector releasably secured to the window and extending along said edges of the window, said protector including, an elongated, generally flat strip including two superimposed layers of corrugated paperboard material, said material being of such weight and strength as to permit the strip to be bent transversely out of a single plane during wrapping thereof around a corner of the window when the protector is installed on the window along the edge thereof, said layers being adhered together along a marginal edge of the strip to form a double-layer spacer flange within the plane of the strip, said layers being unadhered to one another in areas of the strip inboard of the flange, one of said layers having a longitudinally extending line of weakness running alongside of said flange to allow the unadhered portion of said one layer to be hinged out of the plane of the strip about the line of weakness when the protector is to be installed on a window for forming a face flap that projects transversely from the plane of the strip and covers a marginal portion of the face of the window, the unadhered portion of the other layer forming a side flap that is disposed within the plane of the strip and covers a marginal portion of the sides of the window.

55. A protectively wrapped window assembly as claimed in claim 54, said face flap having a plurality of transverse tear lines spaced along the length thereof and intersecting said line of weakness at spaced locations along the latter whereby to present a longitudinal series of tabs that maybe torn out selectively from the face flap to facilitate bending of the protector around a corner of the product.

56. A protectively wrapped window assembly as claimed in claim 55, said line of weakness including slits in the one layer of material between each pair of transverse tear lines to facilitate tear-out of the tabs.

57. A protectively wrapped window assembly as claimed in claim 56, said face flap having a longitudinal crush line therein that extends parallel to the line of weakness in laterally spaced relationship therewith to facilitate tear out of the tabs of the face flap.

58. A protectively wrapped window assembly as claimed in claim 57, said superimposed layers of material being formed from a single sheet of said material folded over along a fold line.

59. A protectively wrapped window assembly as claimed in claim 55, said line of weakness including slits in the one layer of material between each pair of transverse tear lines to facilitate tear-out of the tabs.

60. A protectively wrapped window assembly as claimed in claim 59, said face flap having a longitudinal crush line therein that extends parallel to the line of weakness in laterally spaced relationship therewith to facilitate tear out of the tabs of the face flap.

61. A protectively wrapped window assembly as claimed in claim 60, said superimposed layers of material being formed from a single sheet of said material folded over along a fold line.

62. A protectively wrapped window assembly as claimed in claim 55, said superimposed layers of material being formed from a single sheet of said material folded over along a fold line.

63. A protectively wrapped window assembly as claimed in claim 54, said superimposed layers of material being formed from a single sheet of said material folded over along a fold line.

* * * * *